United States Patent [19]

Chung et al.

[11] Patent Number: 4,588,538

[45] Date of Patent: May 13, 1986

[54] PROCESS FOR PREPARING TAPES FROM THERMOPLASTIC POLYMERS AND CARBON FIBERS

[75] Inventors: Tai-Shung Chung, Summit; Howard Furst, Berkeley Heights, both of N.J.; Zev Gurion, Charlotte, N.C.; Paul E. McMahon; Richard D. Orwoll, both of Mountainside, N.J.; Daniel Palangio, Woodbridge, N.J.

[73] Assignee: Celanese Corporation, New York, N.Y.

[21] Appl. No.: 589,816

[22] Filed: Mar. 15, 1984

[51] Int. Cl.[4] .............................................. B29C 47/02
[52] U.S. Cl. ............................. 264/29.2; 264/29.7; 264/136; 264/174; 264/237; 423/447.8
[58] Field of Search ............... 264/29.2, 29.7, 136, 264/237, 174; 423/447.8

[56] References Cited

U.S. PATENT DOCUMENTS

| | | | |
|---|---|---|---|
| 3,485,912 | 12/1969 | Schrenk et al. | 264/171 |
| 3,673,035 | 6/1972 | Whitney | 264/29.7 |
| 3,839,072 | 10/1974 | Kearsey | 423/448 |
| 3,873,389 | 3/1975 | Daniels | 156/181 |
| 3,993,726 | 11/1976 | Moyer | 264/174 |
| 4,011,293 | 3/1977 | Gale | 264/29.7 |
| 4,083,829 | 4/1978 | Calundann et al. | 528/179 |
| 4,100,004 | 7/1978 | Moss et al. | 264/29.2 |
| 4,274,821 | 6/1981 | Kiemer | 425/114 |
| 4,300,878 | 11/1981 | Ibie | 425/114 |
| 4,460,735 | 7/1984 | Froix | 264/331.21 |

FOREIGN PATENT DOCUMENTS

| | | | |
|---|---|---|---|
| 2507675 | 9/1976 | Fed. Rep. of Germany | 264/136 |
| 754321 | 1/1971 | France | 264/29.2 |
| 48-3536 | 1/1973 | Japan | 264/136 |
| 51-53020 | 5/1976 | Japan | 264/29.2 |
| 58-36216 | 3/1983 | Japan | 264/29.2 |
| 516764 | 9/1976 | U.S.S.R. | 264/29.2 |

Primary Examiner—Jeffery Thurlow
Attorney, Agent, or Firm—Lynch, Sherman & Cox

[57] ABSTRACT

The instant invention involves a process for use in preparing tapes or rovings, which are formed from a thermoplastic material used to impregnate longitudinally extended bundles of carbon fibers. The process involves the steps of (a) gas spreading a tow of carbon fibers; (b) feeding the spread tow into a crosshead die; (c) impregnating the tow in the die with a thermoplastic polymer; (d) withdrawing the impregnated tow from the die; and (e) gas cooling the impregnated tow with a jet of air.

The crosshead die useful in the instant invention includes a horizontally extended, carbon fiber bundle inlet channel, means for providing melted polymer under pressure to the die, means for dividing the polymeric material flowing into the die into an upper flow channel and a lower flow channel disposed above and below the moving carbon fiber bundle, means for applying the thermoplastic material from both the upper and lower channels to the fiber bundle, and means for withdrawing the resulting tape from the die.

15 Claims, 6 Drawing Figures

PROCESS FOR PREPARING TAPES FROM THERMOPLASTIC POLYMERS AND CARBON FIBERS

This invention was made with government support under contract No. NAS1-15749 awarded by the National Aeronautics and Space Administration (NASA). The Government has certain rights in this invention.

BACKGROUND OF INVENTION

This invention relates to processes for forming fiber reinforced tapes. More particularly, this invention relates to processes for forming impregnated carbon fiber tapes using a crosshead type die.

The use of crosshead dies for coating metallic wires of various types with plastic materials is well known. See, e.g., U.S. Pat. Nos. 4,341,509, 4,247,504, and 4,150,929. Crosshead dies have also been used to coat tire cord with, for example, an acrilonitrile/butadienne copolymeric rubber. See, U.S. Pat. Nos. 4,328,133 and 4,300,878. Other patents disclosing the use of crosshead dies include U.S. Pat. No. 4,171,195, 4,172,106 and 4,274,821.

U.S. Pat. No. 3,485,912 discloses that "high tensile strength elements, such as tapes" may be formed by manufacturing a plurality of synthetic resinous oriented strands or filaments and subsequently encapsulating such materials within a relatively soft low tensile strength matrix or casing.

However, this patent does not disclose the composition of the matrix. Likewise, U.S. Pat. No. 3,461,197, discloses a similar article which consists of a first thermoplastic or thermosetting plastic material having disposed therein a plurality of reinforcing filaments such as fibers or filaments of glass.

U.S. Pat. No. 3,758,247 refers to a crosshead die which is used for coating flat cables utilizing a melt consisting of rubber or plastics including polyethylene or polypropylene. Finally, U.S. Pat. No. 3,993,726, discloses the use of "a crosshead extruder to impregnate the rovings with a thermoplastic polymer under high pressure".

The use of air to spread a carbon fiber prior to impregnation is disclosed in several patents. In U.S. Pat. No. 3,704,485, an apparatus for spreading a graphite fiber tow is disclosed which involves the use of a pulsating, gaseous medium. U.S. Pat. Nos. 3,873,389 and 3,795,944 both disclose the use of a counter air flow means for spreading graphite fiber tows which are to be impregnated with thermosetting materials.

The cooling of impregnated carbon fiber bundles following crosshead die extrusion is also known. For example, in U.S. Pat. No. 3,993,726, cooling sprays or a cooling bath are used, and in U.S. Pat. No. 3,728,424, electrical cables impregnated with a polyester in a crosshead die are cooled by passing through a first ambient air cooling zone and then into a second water cooling tank.

However, none of the above-identified patents discloses either the inventors' specific gas jet spreading system, their crosshead die design or their air cooling means as disclosed hereafter.

In the prior art, carbon fiber-based, prepreg tapes were normally prepared using thermoset resins, with the thermoset resin itself literally painted onto the tapes in an uncured condition. However, care had to be taken to insure that the temperature of the tape remained low during storage, so that autocuring did not occur. When the tape was to be used in forming an article, layers of the tape with the desired orientation were placed on an appropriate form, heated to the curing temperature in a controlled manner and normally under vacuum and/or externally applied pressure baked for the period of time necessary to insure a complete cure. But a major problem with this system was that after curing, it was impossible to reform the article if errors in forming had occurred. Therefore, large amounts of wasted material often resulted. Finally, using this method, it was difficult to obtain thick, uniform coatings and the adhesion of the thermoset polymer to the carbon fiber was often poor.

Thus, it is an object of the instant invention to prepare a simple and inexpensive, but readily usable, crosshead die.

It is another object of this invention to prepare such a die for use in impregnating fibers with thermoplastic, resinous, materials.

It is another object of this invention to prepare tapes which are based upon a thermoplastic resinous, fibrous matrix.

These and other objectives are obtained by utilizing the process of the instant invention.

SUMMARY OF INVENTION

The instant invention involves a process for preparing thermoplastic impregnated tapes and rovings which employs the steps of gas spreading a carbon fiber tow, feeding the tow into a crosshead die, impregnating the tow with a thermoplastic material to form a tape, withdrawing the tape from the die, and gas cooling, as described hereafter. The process of the instant invention allows the application of high molecular weight, high melting, thermoplastic polymers under controlled conditions without the use of a solvent. The tapes of the instant invention may be employed to form shaped articles, such as airplane wing skins and/or other wing components, and may be reused even after shaping by simply heating to slightly above the polymer melting point and reshaping or reforming.

DESCRIPTION OF THE DRAWINGS

FIG. 2-A is a perspective view of the same devise with the top removed.

SUMMARY OF PROCESS

Figure 1:
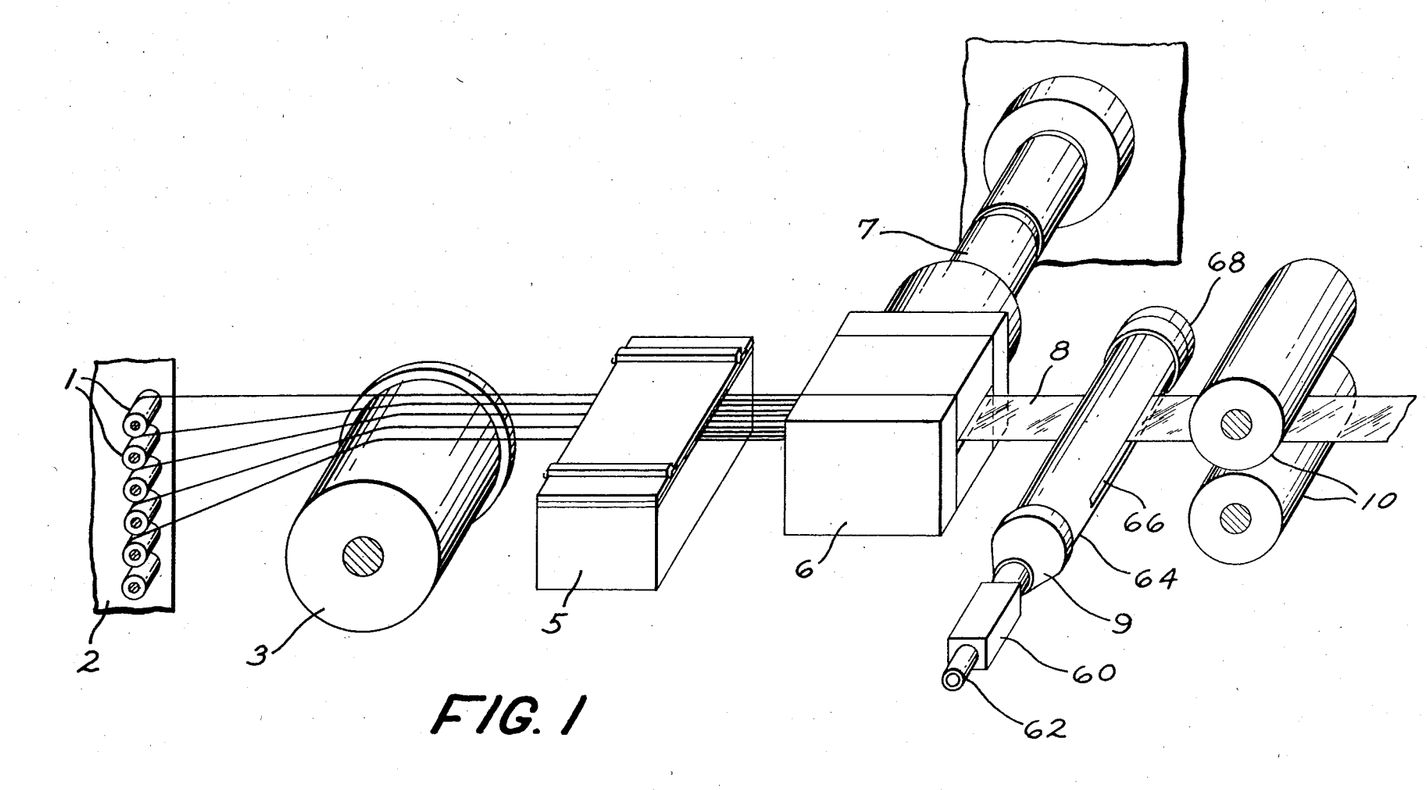
FIG. 1 is a diagramatic view of the various devices used in carrying out the process of the instant invention

In FIG. 1, several graphite fiber bundles (1) are shown. The tow or bundles are conveyed to the crosshead die by a suitable drive roll (3). In order to insure uniform spreading of each of the graphite fiber bundles, they are passed over a gas spreading means (5). After uniform spreading, the fibers enter the crosshead die (6). The thermoplastic polymer which is used to impregnate the fiber tow is added in pellet or other dry form to the extruder, melted and conveyed to the crosshead die through a barrel (7). After impregnating the fiber tow to form a tape (8), the tape is withdrawn from the die and passed through the gas cooling means (9), using suitable drive rollers (10).

The polymers which are useful in carrying out the process of the instant invention for impregnating carbon fibers constitute virtually any type of relatively high molecular weight thermoplastic polymer, including polyethylene, polypropylene, polyester, the various polyamides, polyimides, polyamidimides, polyetherimides, polysulfones, e.g., polyether sulfones, polyether ether ketones, polybutylene terephthalate and the like. The melting point of the polymer must be at least 50° F. and preferably at least 200° F. above ambient conditions. Higher melting temperatures insure that there will be no undue sticking or binding of the extruded polymer tapes prior to use. In addition to one component polymer systems, mixtures of various thermoplastic polymers may also be employed to advantage where specific combinations of properties are desired.

Of particular importance are the liquid crystal polymers or LCPs. Examples of these polymers include the wholly aromatic polyester resins which are discussed in the following publications: (a) *Polyesters of Hydroxybenzoic Acids,* by Russell Gilkey and John R. Caldewell, J. of Applied Polymer Sci., Vol. II, Pages 198 to 202 (1959), (b) *Polyarylates (Polyesters From Aromatic Dicarboxylic Acids and Bisphenols),* by G. Bier, Polymer, Vol. 15, Pages 527 to 535 (August 1974), (c) *Aromatic Polyester Plastics,* by S. G. Cottis, Modern Plastics, Pages 62 to 63 (July 1975); and (d) *Poly(p-Oxybenzoyl Systems): Homopolymer for Coatings: Copolymers for Compression and Injection Molding,* by Roger S. Storm and Steven G. Cottis, Coatings Plast. Preprint, Vol. 34, No. 1, Pages 194 to 197 (April 1974). See also, U.S. Pat. Nos. 3,039,994; 3,169,121; 3,321,437, 3,553,167; 3,637,595; 3,651,014; 3,723,388; 3,759,870; 3,767,621; 3,778,410; 3,787,370; 3,790,528; 3,829,406; 3,890,256; and 3,975,487.

Other polyesters are disclosed, for instance, (a) Polyester X7G-A Self Reinforced Thermoplastic, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 838,935 and 828,936, (c) Dutch Pat. No. 7505551, (d) West German Pat. Nos. 2520819, 2520820, 27222120, 2834535, 2834536 and 2834537, (e) Japanese Pat. Nos. 43-223; 2132-116; and 3021-293, and (f) U.S. Pat. Nos. 3,991,083; 4,991,014; 4,057,597; 4,066,620; 4,067,852; 4,075,262; 4,083,829; 4,093,595; 4,112,212; 4,118,372; 4,130,545; 4,130,702; 4,146,702; 4,153,779; 4,156,070; 4,159,365; 4,160,755; 4,161,470; 4,169,933; 4,181,792; 4,183,895; 4,184,996; 4,188,476; 4,191,681; 4,201,856; 4,219,461; 4,224,433; 4,226,970; 4,230,817; 4,232,143; 4,238,598; 4,238,600; 4,239,913; 4,242,496; 4,245,082; 4,245,804; 4,247,514; 4,256,624; 4,265,802; 4,267,289; 4,269,965; 4,279,803; and 4,299,756.

The polyesters and copolyesters which are preferred consist essentially of structural units having recurring groups of the formula (I)

and (II)

and/or (III)

wherein units I and II, if present, are present in substantially equimolar amounts; $R_1$, $R_2$ and $R_3$ are radicals selected from the group of (1) single and fused six-membered aromatic carbocyclic ring systems wherein the chain-extending bonds of the ring system if attached to the same ring, are positioned 1,3- or 1,4- (preferably 1,4-) to each other, and if attached to different rings, are preferably in positions parallel and oppositely directed, and (2) multiple six-membered aromatic carboxcyclic ring systems in which the individual rings are joined by a chemical bond or a trans-vinylene group and in which the chain extending bonds of each ring are in the 1,3- or 1,4- (preferably 1,4-) positions; $R_2$ may also be wherein A is a divalent radical containing one or two bycyclic in-chain atoms; and $R_3$ may also be wherein the aliphatic portion is attached to the carbonyl group. Preferred group (1) radicals are phenylene and naphthylene. Preferred group (2) radicals are two-ring systems. Illustrative of (1) are and of (2) are and

The foregoing ring systems, except for $R_2$, as indicated below are also intended to include one or more substituents, e.g., chloro, bromo, fluoro, or lower alkyl (1–4 carbon atoms) on the ring or rings. The $R_2$ aromatic ring systems should preferably be unsubstituted when only one kind of unit I and one kind of unit II are used, i.e., when a homopolymer is formed to insure obtaining oriented fibers. In the case of copolymers, it is preferred that the $R_2$ aromatic ring systems be unsubstituted be- cause of thermal or hydrolytic instability and/or cost of the R$_2$-ring substituted copolymers.

Also included are those (co)polyesters wherein up to 25 mol %, preferably up to 5 mol %, based on the total I, II and III units, are aromatic polymer-forming units (i.e., units wherein the chain extending functional groups are attached to aromatic rings) not conforming to those described above and which do not interfere with the anisotropic melt forming capability of the polymers. A non-limiting list of these units includes The (co)polyesters, as mentioned above, may comprise units I and II in substantially equimoler amounts or may comprise unit III or may comprise a combination of units I, II, and III and, of course, more than one kind of unit (I, II and/or III) can be present in the polymer.

Preferred (co)polyesters of the invention consist essentially of units I and II. In such polymers, it is preferred that R$_1$ is selected from the group of 1,4-phenylene; chloro-, dichloro-, bromo-, dibromo-, methyl-, dimethyl- and fluoro-1,4-phenylene; 4,4'-biphenylene; 3,3',5,5'-tetramethyl-4,4'-biphenylene and R$_2$ is selected from the group of trans-1,4-cyclohexylene; trans-2,5-dimethyl-1,4-cyclohexylene; trans-vinylenebis(1,4-phenylene); 4,4'-biphenylene; 2,6-naphthylene; and 1,4-phenylene and with the proviso that more than one kind of unit I or II are present. Of such copolyesters, two types are particularly preferred because of properties and cost. In the first type, the polymers consist essentially of the recurring units wherein X is selected from the group of chloro-, bromo-, fluoro-, and methyl radicals; n is 1 or 2; and Y is selected from the group of 4,4'-biphenylene and 2,6-naphthylene, the ratio of units being within the range of 4:1 to 1:4. In the second type, the polymers consist essentially of the recurring units wherein Z is selected from the group of 4,4'biphenylene, 2,6-naphthylene, and 1,4-phenylene, the ratio of units being within the range of 4:1 to 3:2. With each type of polymer, up to 25 mol percent of non-conforming units may be present as described above.

Of the (co)polyesters containing only type III units, the polymers consisting essentially of the recurring units (1,4-benzoate unit)    (1,4-cinnamate unit)

are preferred.

The (co)polyesters are prepared preferably by melt polycondensation of derivatives of dihydric phenols and aromatic-aliphatic, aromatic and cycloaliphatic dicarboxylic acids or their derivatives. A convenient preparative method is the melt polycondensation of the diacetate of a dihydric phenol with a dicarboxylic acid. Alternatively, phenolic carboxylic acids or their derivatives may be used as coreactants in the preparation of polyesters and copolyesters.

A list of useful dihydric phenols preferably in the form of their diacetate derivatives includes hydroquinone, chlorohydroquinone, bromohydroquinone, methylhydroquinone, dimethylhydroquinone, dichlorohydroquinone, dibromohydroquinone, 4,4'-oxydiphenol, 4,4'-isopropylidenediphenol, 4,4'-thiodiphenol, 4,4'-biphenol, 3,5,3',5'-tetramethyl-4,4'-bisphenol, 3,5,3',5'-tetrachloro-4,4'-biphenol, 2,6-dihydroxynaphthalene, 2,7-dihydroxynaphthalene, and 4,4'-methylenediphenol and the like.

A list of useful dicarboxylic acids includes terephthalic acid, 4,4'-bibenzoic acid, 4,4'-oxydibenzoic acid, 4,4'-thiodibenzoic acid, 4-carboxyphenoxyacetic acid, 4,4'-trans-stilbenedicarboxylic acid, 2,6-naphthalenedicarboxylic acid, ethylenedioxy-4,4'-dibenzoic acid, isophthalic acid, the halogen and methyl substituted derivatives of the foregoing dicarboxylic acids, 1,4-trans-cyclohexanedicarboxylic acid, 2,5-dimethyl-1,4-trans-cyclohexanedicarboxylic acid, and the like.

A nonlimiting list of phenolic carboxylic acids includes 6-hydroxy-2-naphthoic acid, 4-hydroxy-4'carboxy azobenzene, ferulic acid, 4-hydroxybenzoic acid, 4-(4'-hydroxyphenoxy)benzoic acid and 4-hydroxycinnamic acid and the alkyl, alkoxy and halogen substituted versions of these compounds.

In addition, it is possible to prepare anisotropic polymers by polymerizing methylacryloxy benzoic acid utilizing an alkali metal hydroxide and free radical initiators as described in U.S. Pat. Nos. 4,112,212, 4,130,702 and 4,160,755.

Useful phenolic-carboxylic acid derivatives include p-acetoxybenzoic acid and p-acetoxycinnamic acid and the like.

A nonlimiting list of various polyesters and copolyesters includes: poly(methyl-1,4-phenylene 2,5-dimethyl-trans-hexahydroterephthalate); copoly(methyl-1,4-phenylene trans-hexahydroterephthalate/terephthalate) (8/2); copoly(chloro-1,4-phenylene trans-hexahydroterephthalate/isophthalate) (9/1) and (8/2); copoly(ethyl-1,4-phenylene terephthalate/2,6-naphthalate) (7/3); copoly(tert. butyl-1,4-phenylene/3,3',5,5'-tetramethyl-4,4'-biphenylene/terephthalate) (7/3); copoly(chloro-1,4-phenylene/3,3',5,5'-tetrachloro-4,4'-biphenylene terephthalate) (7/3).

The liquid crystal polymers including wholly aromatic polyesters and poly(ester-amide)s which are suitable for use in the present invention may be formed by a variety of ester forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acryoxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final state of the condensation (e.g., acetic acid or water).

Commonly-assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety. Although that patent is directed to the preparation of wholly aromatic polyesters, the process may also be employed to form poly(ester-amide)s.

When employing either the melt acidolysus procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided. When poly(ester-amide)s are to be formed, an amine group may be provided as a lower acyl amide.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters and poly(ester-amide)s suitable for use in the present invention tend to be substantially insoluble in common polyester solvents and accordingly are not susceptible to solution processing. As discussed previously, they can be readily processed by common melt processing techniques. Most suitable wholly aromatic polymers are soluble in pentafluorophenol to a limited extent.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(ester-amide)s which are preferred for use in the present invention commonly exhibit a molecular weight of about 5,000 to 50,000, and preferably about 10,000 to 30,000; e.g., 15,000 to 17,000. Such molecular weight may be determined by gel permeation chromatography and other standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and poly(ester-amide)s additionally commonly exhibit an inherent viscosity (I.V.) of at least approximately 2.0 dl./g., e.g., approximately 2.0 to 10.0 dl./g., when dissolved at a concentration of 0.1 percent by weight in pentafluorophenol at 60° C.

For the purposes of the present invention, the aromatic rings which are included in the polymer backbones of the polymer components may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl and substituted phenyl. Preferred halogens include fluorine, chlorine and bromine. Although bromine atoms tend to be released from organic compounds at high temperatures, bromine is more stable on aromatic rings than on aliphatic chains, and therefore is suitable for inclusion as a possible substituent on the aromatic rings.

The fibers useful herein are basically carbon fibers which may be prepared by a variety of methods. Virtually any of the prior art methods of carbon fiber preparation may be employed in this invention.

The preparation of carbon fibers has been well known in the art for many years. Basically, there are two methods for preparing these fibers, which differ with respect to the starting materials employed. One method starts with a natural or synthetic fiber, which is then carbonized. In the other process petroleum pitch or coal tar pitch is used as the starting material.

Typical of the patents involving the use of pitch is U.S. Pat. No. 4,317,809, which is incorporated herein by reference, along with the other patents cited therein. Generally, using the pitch process, the pitch is heated under high pressure and then under atmospheric pressure with sparging to form a mesophase pitch. Following this step, the pitch is converted into a fiber, thermoset, and carbonized.

Included among the fibers which may be formed into graphite or carbon fibers and are useful in this invention are those materials where the polymeric precursor is, for example, cellulose, acrylic derivatives, and, in particular, polyacrylonitriles. Specifically, the acrylic polymer may contain not less than about 85 mol percent of acrylonitrile units, with not more than about 15 mol percent of a monovinyl compound which is copolymerizable with acrylonitrile, such as styrene, methylacrylate, methylmethacrylate, vinyl acetate, vinyl chloride, vinylidene chloride, vinyl pyridine and the like. Other copolymerizable monomers include styrene sulfonic acid, allyl sulfonic acid, alkyl acrylates and methacrylates, vinyl acetate, vinyl proprionate, vinyl chlorine, vinylidine chloride, and the like.

There are numberous procedures for carbonizing the precursor fibers of the instant invention. In general, they involve a first heating step in the range of about 200°–400° C., followed by a second heating step in a non-oxidizing atmosphere at temperatures ranging from 800°–3000° C. For examples of these processes which are incorporated by reference herein, see U.S. Pat. Nos. 4,197,282, 4,079,122, as well as U.S. Pat. No. 4,131,644.

FIG. 1 is a drawing of the overall process of the instant invention. A fiber roll frame (2) is shown which contains numerous rolls of graphite fiber tows. The individual fiber tows are pulled from the fiber bundles onto a roll (3) and from the roll directed into an gas jet spreading means (5), which acts to spread the fibers to provide better wetability in the crosshead die (6). After impregnation of the fibers, the high temperature, semi-molten tape which results is pulled from the die by drawing rolls (10), while being cooled by gas cooling means (9).

Figure 2:
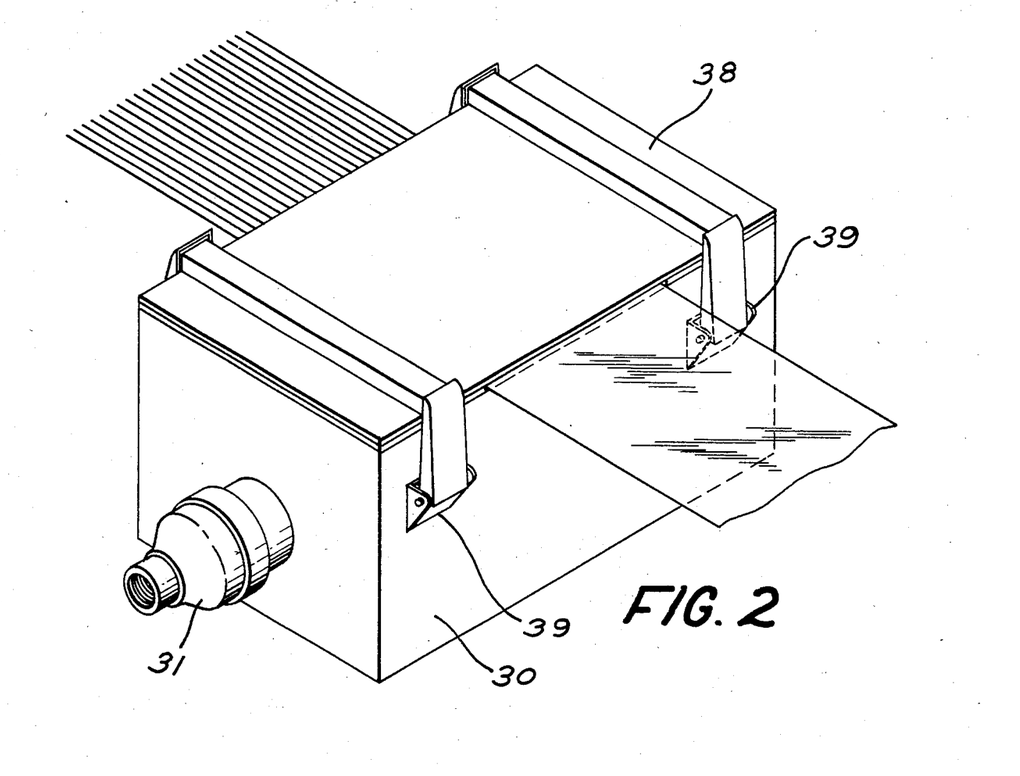
FIG. 2 is a perspective view of the gas jet carbon fiber spreader used in carrying out the process of the instant invention.
Figure 2A:
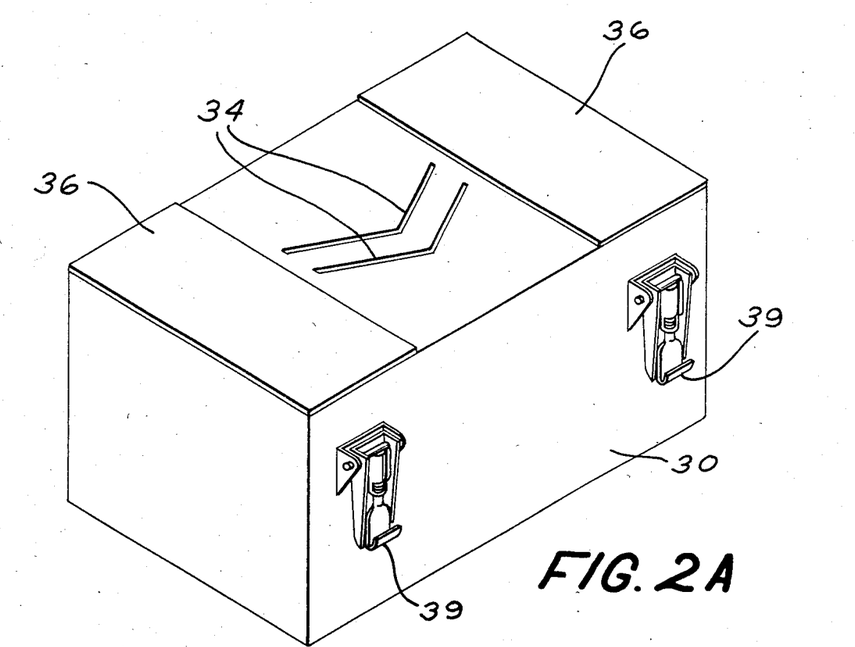

The purpose of the gas jet spreading means shown in FIG. 2 is to insure that the bundles or tows of individual carbon fibers, which may each contain up to as many as 24,000 fibers, are uniformly spread out across the entire width of the merged tow. Unless uniform distribution of the fibers is obtained, the strength properties of the resulting tape will not be uniform and the tape will have a tendency to split along its lengthwise direction. The gas jet spreading means consists of a gas box (30) into which compressed air or another gas is fed through a conventional adjustable gas metering means (31). The preferred pressure of gas flow into the gas jet spreading means is in the range of approximately 40–90 psi. One, or more than one, gas exit ports (34) are provided to cause gas from within the gas box to impinge in a generally perpendicular fashion on the moving fiber tows that pass across the exit ports. Preferably the exit ports are "V" shaped and pointed in the direction of movement of the fiber tow. After exiting from the air spreading means, the tow demonstrates a relatively uniform appearance across its entire width. The gas spreading means, as shown in FIG. 2-A, is provided with shims (36) or other means to allow an air box cover (38) to be attached, so that a flow channel for the carbon fiber tow is provided. The gas box is held in place by convenient attached means, such as clamps (39).

Figure 4:
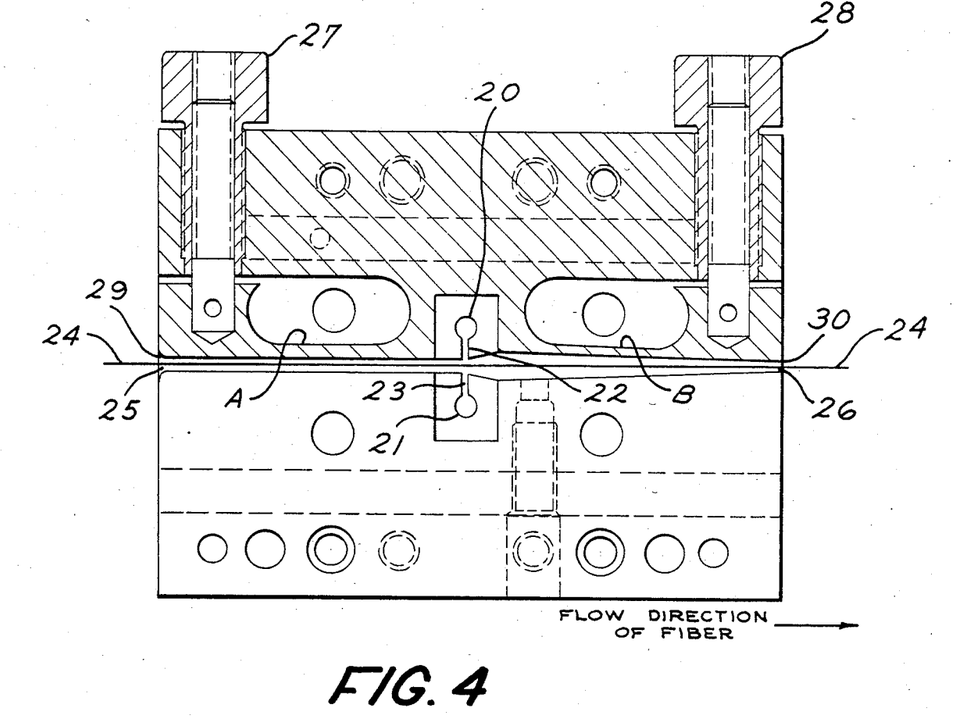
FIG. 4 is a cutaway end view of the crosshead die of the instant invention.

The fiber bundles which are introduced into the crosshead die generally perpendicular to the direction of flow of the polymer melt, are fed into the crosshead die through a horizontally extended fiber entry window (25) shown in FIG. 4. As the fiber moves through the crosshead die and reaches the point where the polymer exits from the lower and upper exit ports (23) and (22), the polymer is forced into contact with the fibers actually surrounding each individual fiber. The resulting impregnated fiber tape exits from the die through a horizontally extended exit window (26). Within the crosshead die itself, entrance window adjustment means (27) and exit window adjustment means (28) are provided. In a preferred embodiment, the adjustment means comprise threaded screws which cause the leading edge of the entrance die lips (29) and the exit die lips (30) to deflect downwardly as pressure from the screw is increased upon the die lips. In order to facilitate adjustment of the width of the die lips, hollow spaces are provided at A and B within the die. The die may also be equipped with a pressure transducer means and various thermocouples or heating elements to monitor and control conditions within the die.

Figure 3:
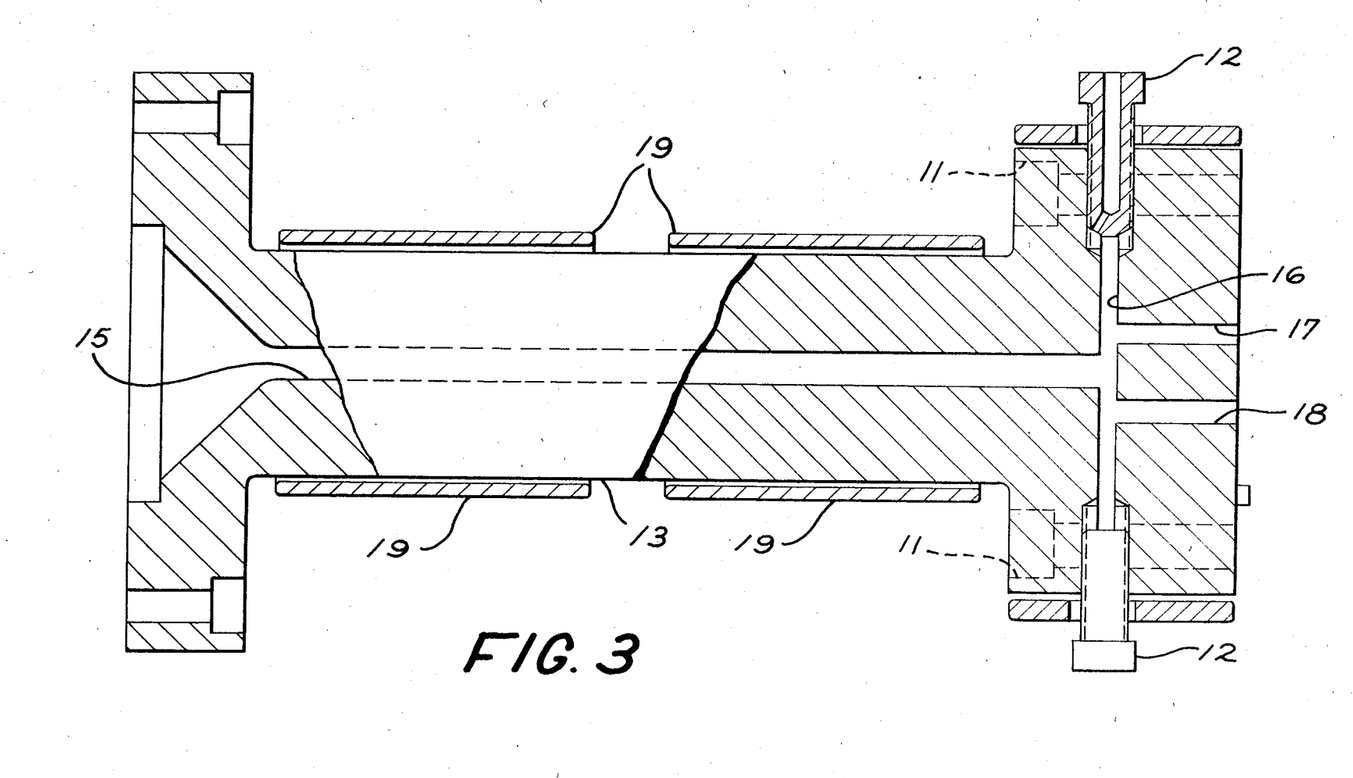
FIG. 3 is a cutaway side view of the polymer entry port of the crosshead die of the instant invention.

The extruder which is used for extruding the thermoplastic polymer disclosed herein may be of any conventional design, although the preferred types are the so-called screw extruders (preferably twin screw). Polymeric flake or chip is added to the extruder, melted and then forced out from the extruder and in through the entry barrel (13) of the crosshead die, as shown in FIG. 3. The molten polymer enters the barrel at the entry port (14) and is conducted along a main polymer flow channel (15) to the division chamber (16), where the flow of the polymer is divided into an upper flow channel (17) and a lower flow channel (18).

The temperature at which the extruder operates is of course dependent on the melting point of the thermoplastic polymer which is to be used for fiber impregnation. In general, it is preferred that the extruder be operated approximately 30°–55° C. higher than the melting point of the polymer. For example, with the liquid crystal type polymers disclosed above, the melting point is in the range of 270°–300° C. It is important that extrusion temperatures not greatly exceed the polymer's melting point because of the possibility of polymer heat degradation. The pressure within the crosshead die is relatively low, usually no more than about 2 or 3 atmospheres, but is above ambient pressure, in order to assure that there is complete wetting of the carbon fiber with the thermoplastic polymer.

After the polymer is forced from the extruder and enters the barrel through entry port (14), it is maintained at or above the desired temperature by means of variable heaters (19) which surround the barrel. In order more accurately to control the flow of polymer through the barrel from the extruder to the crosshead die, a metering pump may be attached within the barrel. This pump adjustably controls the rate of flow of the extruded polymer into the crosshead die.

The entry barrel is attached to the extruder and the crosshead die by the use of attachment means (11). Preferably these devices are simply bolted together. The flow rate of the polymer through the barrel is controlled by the rate at which the polymer is added to the extruder, the rate at which the extruder is operating, and by flow control valves (12) which control the flow to the upper and lower flow channels (17) and (18) respectively.

FIG. 4 is a cutaway end view of the crosshead die of the instant invention. An end view of the upper polymer flow channel is shown at (20), while at (21) an end view of the lower polymer flow channel is shown. The polymer which flows into these areas of the die, exits through upper and lower exit ports (22) and (23) and impregnates the fiber bundles (24) which are moving in the direction of flow through the crosshead die as shown. The rate of flow of the polymer through the crosshead die is determined by the rate at which it is fed to the die by the extruder. The rate of tape formation may vary from 0.1 to 10 feet per minute. Using the crosshead die and process of this invention, tapes having widths of up to about 6" and thicknesses of from about 2 to about 20 mils may be prepared.

Figure 5:
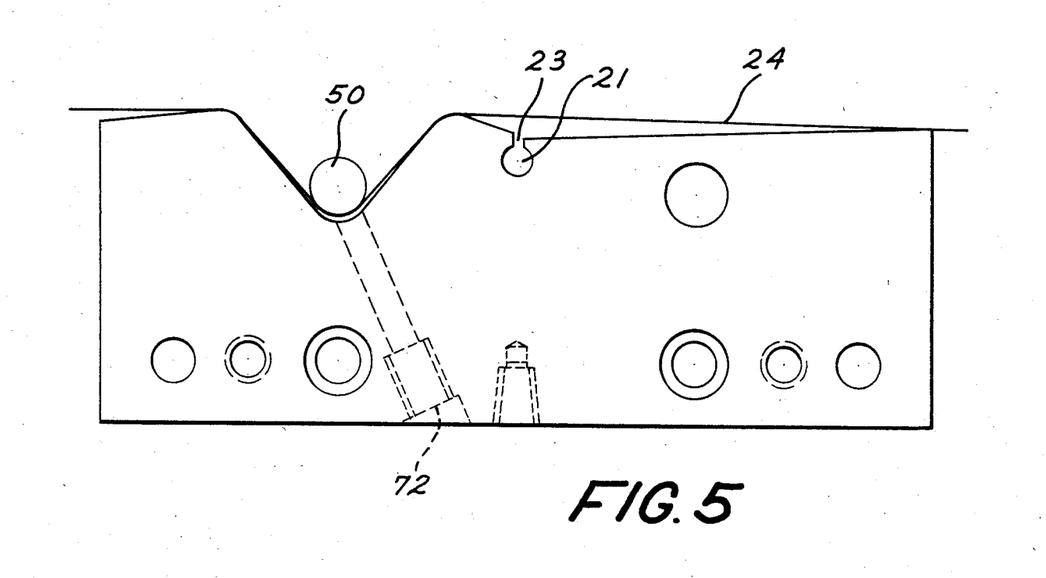
FIG. 5 is another version of the bottom half of FIG. 4.

A partial cutaway end view of a modification of the crosshead die of the instant invention is shown in FIG. 5. In order to increase tension on the incoming fibers, a fiber diversion path is provided. In this modification, instead of providing a straight path for the fibers to follow through the crosshead die, a diversion around a stationary spindle (50) is provided. This diversion increases the tension on the fibers, thereby increasing the adhesion of the polymer to the fiber. The modified crosshead die is also provided with a drain opening (72) to allow escape of excess impregnation plastic as it builds up within the die.

After impregnation, the resulting tape is pulled from the exit die by the drive rolls 10, and immediately cooled in a gas cooling means (64), as shown at FIG. 1. The purpose of immediate gas cooling (i.e., air cooling) is to insure that the tape which leaves the crosshead die in a semimolten, and therefore, weakened state, does not pull apart transversely prior to cooling. The gas cooler, as shown in FIG. 1, includes an air regulator (60), an air regulation gauge, and a tube (64) for providing compressed air or another gas to the cooler. The cooler is designed in such a fashion that gas is provided both above and below the plane of the exiting tapes. In a preferred device a longitudinally extended, cylindrical tube (64) is provided with a uniform flow of air. The tube itself may be equipped with a filter/diffusion screen, so as to insure that a relatively uniform flow of air appears across the entire crosssectional area of the air cooler. In order to allow passage of the tape through the device, openings commensurate with the width and height with the tape (66) are provided. The openings should be at least wide enough to allow ready passage of the tape without any obstruction or contact between the tape and the gas cooler itself. A closure cap (68) may optionally be provided to maintain gas pressure within the tube. Preferably the gas is air which is provided to the tube at about the 20 psi level.

After the tapes of the instant invention have been prepared, they may be formed into the desired shapes. In practice, the tapes are placed on a mold and arranged in an orientation order dictated by the structural requirements of the article being formulated. Usually some layers will be placed at cross angles to each other in order to improve transverse strength. The tapes are then heated to the desired temperature, which is slightly above the melting point of the polymer material which has been employed and pressure is applied to form a consolidated article. The tapes or articles prepared from the crosshead die of the instant invention may be reused after formation by simply remelting the tapes and then reorienting and/or reforming them.

EXAMPLE 1

A copolymer based upon LCP4060, manufactured by Celanese Specialty Operations, having a melting point of about 275° C. and an average I.V. of about 4.0, was prepared in a reactor and rendered in chip form. The polymer is a reaction product of 2,6-hydroxy naphthanoic acid, terephthalic acid, and para-aminophenol. The polymer chip was then added to a ZSK model twin-blade extruder operating at a temperature of about 300° C. The melted polymer from the extruder was fed into the barrel of a crosshead die at the rate of 10 gms per second. The barrel itself had been heated to and was maintained at approximately 310° C. throughout, as monitored by thermocouples attached to the barrel. Within the barrel, the polymer was forced into upper and lower flow channels and ultimately into the crosshead die itself, entering the die at a 90° angle to the flow of the polymer was a carbon fiber tow.

A carbon fiber tow was prepared by assembling on a grid fifteen individual, small-sized fiber tows of carbon fiber having an approximate fiber count of 6000 per bundle for a total of 90,000 individual fibers. The carbon fibers themselves were prepared based upon acrylonitrile copolymers having a percent elongation of 1.3 percent at room temperature and are known under the trade name of Celion. The 15 bundles were merged onto a drive roll and fed through an air jet spreading device which uniformly spread the individual fiber tows into a single fiber tow having a width of approximately $3\frac{1}{2}$". The air jet spreading device contained a pair of V-shaped air impingement slots, and air was fed into the device at a pressure of 60 psi. (The pressure inside the box was about 5 psi.) After air jet spreading, the combined tow was fed into the crosshead die at the rate of approximately 0.3 meters per minute. Upon entering the crosshead die, the fiber was deflected from its normal path by a stationary deflection bar located within the crosshead die. The bar served to increase the tension of the fiber. Within the die the fiber was forced into contact with the polymer coming from the extruder through the barrel. The polymer within the die was maintained at approximately 315°–320° C. The polymer was forced into contact with the carbon fiber, from both above and below the plane of the fiber. The resulting tape exited from the die through compressed die lips to produce an impregnated fiber tape having a width of approximately 3" and a thickness of about 3–5 mil.

Immediately after extrusion from the die, the tape was air cooled in an air quench device which provided a flow of air above and below the tape. The air quench device was operated at an internal air pressure of 1 atmosphere. The tape itself was pulled from the die by a pair of rubber driven rolls and wound up between sheets of paper onto a large roll. The resulting tape was useful in preparing composite structures.

EXAMPLE 2

Example 1 was repeated except that in place of the Celion fiber a Hercules Co., Intermediate Modulus CF,IM-6 carbon fibers having an epoxy size was employed on 20 bobbins. A satisfactory tape useful in preparing composite structures resulted.

EXAMPLE 3

Example 1 was repeated except that a high-strength carbon fiber having a 1.7% elongation at room temperature was employed on 15 bobbins. The fiber is available from the Celanese Specialty Operations under the trade name of Celion. A satisfactory tape resulted.

EXAMPLE 4

Example 1 was repeated except that a copolymer (LCP2000), available from the Celanese Specialty Operations, based upon hydroxy benzoic acid and hydroxy naphthoic acid, was obtained having a melting point of about 250° C. and an I.V. of about 2.5 and rendered in chip form. The polymer was then added to a ZSK model twin-blade extruder operating at a temperature of about 260° C. The extruder was fed into the barrel of a crosshead die. The barrel of the crosshead die was also heated to 260° C. A tow was prepared as in Example 1, using a bobbin rack and ten individual, small-sized fiber tows. The polymer in the crosshead die itself was maintained at approximately 275° C. Otherwise processing was the same as in Example 1. A satisfactory tape was preparing using this process.

What is claimed is:

1. A process for preparing tapes from thermoplastic polymers and carbon fibers which comprises:
    (a) spreading a tow of carbon fibers to provide substantially complete wetting of the carbon fibers when impregnated in a crosshead die;
    (b) feeding the tow into a crosshead die;
    (c) impregnating the tow in the crosshead die under pressure with a thermoplastic polymer to form a tape;
    (d) withdrawing the tape from the die; and immediately thereafter;
    (e) cooling the tape with a jet of gas.

2. A process for preparing tapes from thermoplastic polymers and carbon fibers which comprises:
    (a) gas jet spreading a tow of carbon fibers;
    (b) feeding the tow into a crosshead die;
    (c) impregnating the row under pressure with a thermoplastic polymer to form a tape;
    (d) withdrawing the tape from the die; and immediately thereafter
    (e) cooling the tape with a jet of gas.

3. The process of claim 1 or claim 2 wherein the thermoplastic polymer is selected from the group consisting of polyethylene, polypropylene, polyesters, polyamides, polyimides, polyamidimides, polyetherimides, polysulfones, polyether ether ketones, and wholly aromatic polyester resins.

4. The process of claim 1 or claim 2 wherein the thermoplastic polymer is a polyester or copolyester having an I. V. in the range of about 3 to about 6.

5. The process of claim 1 or claim 2 wherein the thermoplastic polymer is a liquid crystal polymer.

6. The process of claim 1 or claim 2 wherein the thermoplastic polymer is a wholly aromatic polyester.

7. The process of claim 1 or claim 2 wherein the carbon fiber is prepared by a first heating step in the range of about 200°–400° C., followed by a second heating step in the range of about 800°–3,000° C. and is based upon polyacrylonitrile polymers and copolymers.

8. The process of claim 1 or claim 2 wherein the impregnated tow has a thickness of about 2–20 mils.

9. The process of claim 1 or claim 2 wherein the tow contains up to about 200,000 carbon fibers.

10. The process of claim 2 wherein the gas jet spreading means comprises a gaseous fed gas box having an adjustable gas metering means and a gas exit port for impinging air upon the moving fiber tow.

11. The process of claim 10 wherein the air flow into the air box is in the range of about 40–90 psi, and the exit port is V-shaped and provides gas generally perpendicular to the fiber tow.

12. The process of claim 1 or claim 2 wherein the crosshead die includes a fiber diversion path around a stationary spindle, thereby increasing the tension on the carbon fiber tow.

13. The process of claim 1 or claim 2 wherein the gas cooling means provides gas both above and below the plane of the extruded tape.

14. The process of claim 13 wherein the gas cooling means is a longitudinally extended cylindrical tube.

15. The process of claim 14 wherein the tube is equipped with a filter/diffusion screen, thereby providing a relatively uniform flow of cooling gas across the tape.

* * * * *